United States Patent
Lee et al.

(10) Patent No.: US 12,540,111 B2
(45) Date of Patent: Feb. 3, 2026

(54) METHOD FOR PREPARING PERFLUORODIALKYL ETHER AND APPARATUS FOR PREPARING PERFLUORODIALKYL ETHER

(71) Applicants: KOREA RESEARCH INSTITUTE OF CHEMICAL TECHNOLOGY, Daejeon (KR); KOREA ELECTROTECHNOLOGY RESEARCH INSTITUTE, Changwon-si (KR)

(72) Inventors: Sang Goo Lee, Daejeon (KR); In Joon Park, Daejeon (KR); Won Wook So, Daejeon (KR); Shin Hong Yook, Daejeon (KR); Hong Suk Kang, Daejeon (KR); Eun Ho Sohn, Daejeon (KR); Ki Dong Song, Changwon-si (KR); Yeon Ho Oh, Changwon-si (KR); Hyun Jae Jang, Gimhae-si (KR)

(73) Assignees: KOREA RESEARCH INSTITUTE OF CHEMICAL TECHNOLOGY, Daejeon (KR); ELECTROTECHNOLOGY RESEARCH INSTITUTE, Changwon-si (KR)

( * ) Notice: Subject to any disclaimer, the term of this patent is extended or adjusted under 35 U.S.C. 154(b) by 476 days.

(21) Appl. No.: 18/018,395

(22) PCT Filed: Jul. 26, 2021

(86) PCT No.: PCT/KR2021/009664
§ 371 (c)(1),
(2) Date: Jan. 27, 2023

(87) PCT Pub. No.: WO2022/025575
PCT Pub. Date: Feb. 3, 2022

(65) Prior Publication Data
US 2023/0278944 A1    Sep. 7, 2023

(30) Foreign Application Priority Data

Jul. 28, 2020  (KR) .................. 10-2020-0094086
Jul. 28, 2020  (KR) .................. 10-2020-0094087

(51) Int. Cl.
*C07C 41/18* (2006.01)
*C07C 41/42* (2006.01)
*C07C 43/12* (2006.01)

(52) U.S. Cl.
CPC .............. *C07C 41/18* (2013.01); *C07C 41/42* (2013.01); *C07C 43/12* (2013.01)

(58) Field of Classification Search
CPC .......... C07C 43/12; C07C 41/18; C07C 41/42
See application file for complete search history.

(56) References Cited

U.S. PATENT DOCUMENTS 5,331,066 A * 7/1994 Takanoo ................ C08G 81/00
                                                                       525/437
6,225,511 B1   5/2001 Chambers et al.
(Continued)

FOREIGN PATENT DOCUMENTS

| CN | 111116347 A | * | 5/2020 | .......... C08G 65/324 |
|---|---|---|---|---|
| KR | 10-2003-0038654 A | | 5/2003 | |
| KR | 10-2008-0089339 A | | 10/2008 | |
| KR | 10-2018-0000720 A | | 1/2018 | |
| WO | 2007/053697 A2 | | 5/2007 | |

OTHER PUBLICATIONS

Machine translation of CN111116347A, May 8, 2020, pp. 1-5 (Year: 2020).*

(Continued)

*Primary Examiner* — Medhanit W Bahta
(74) *Attorney, Agent, or Firm* — Sughrue Mion, PLLC

(57) ABSTRACT

The present invention relates to a method for preparing a perfluorodialkyl ether, comprising the steps of: (A) preparing a perfluorodialkyl ether from a compound represented by Formula 1 in the presence of a metal fluoride; and (B)

(Continued)

isolating the perfluorodialkyl ether, and to an apparatus for preparing perfluorodialkyl ether, comprising: a reactor for preparing a perfluorodialkyl ether from a compound represented by Formula 1 in the presence of a metal fluoride; a reactant supplier for introducing the compound represented by Formula 1 into the reactor; and a discharge unit for discharging the perfluorodialkyl ether from the upper portion of the reactor.

12 Claims, 6 Drawing Sheets

(56) References Cited

U.S. PATENT DOCUMENTS

| | | |
|---|---|---|
| 10,301,236 B2 | 5/2019 | Sun et al. |
| 2003/0135067 A1 | 7/2003 | Okazoe et al. |
| 2016/0185719 A1 | 6/2016 | Monzani et al. |

OTHER PUBLICATIONS

Hudlicky, T. et al. "Practical preparation of potentially anesthetic fluorinated ethyl methyl ethers by means of bromine trifluoride and other methods" Journal of Fluorine Chemistry (2000), 102(1-2), 363-367 (Year: 2000).*

A. P. Molchanov et al., "Product Subclass 2: 1-Halo-1-(organooxy)alk-1-enes", Science of Synthesis, pp. 129-166.

Takashi Abe et al., "The electrochemical fluorination of N-containing carboxylic acids (Part 4*). Fluorination of methyl 3-dialkylamino-isobutyrates and methyl 3-diallqlamino-n-butyrates", Journal of Fluorine Chemistry, 1994, pp. 193-202, vol. 66.

Ripudaman Malhotra et al., "George Andrew Olah Across Conventional Lines", Resonance, Dec. 2017, pp. 1111-1153.

Akira Sekiya et al., "Synthesis of Perfluoroethylmethylether by Direct Fluorination", Chemistry Letters, 1990, pp. 609-612.

International Search Report of PCT/KR2021/009664 dated Nov. 1, 2021 [PCT/ISA/210].

* cited by examiner

[FIG. 1]
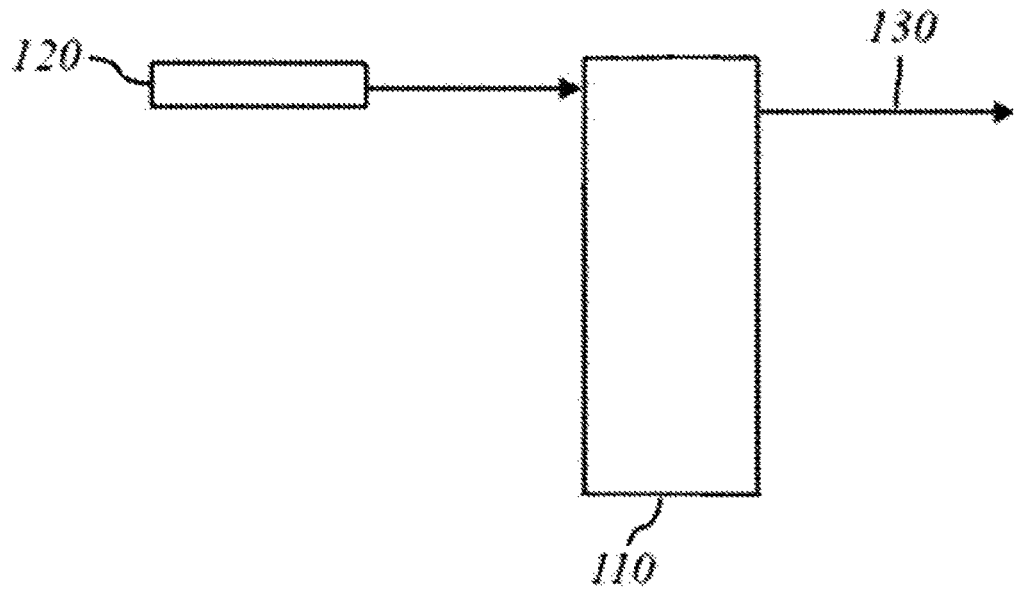
[FIG. 2]
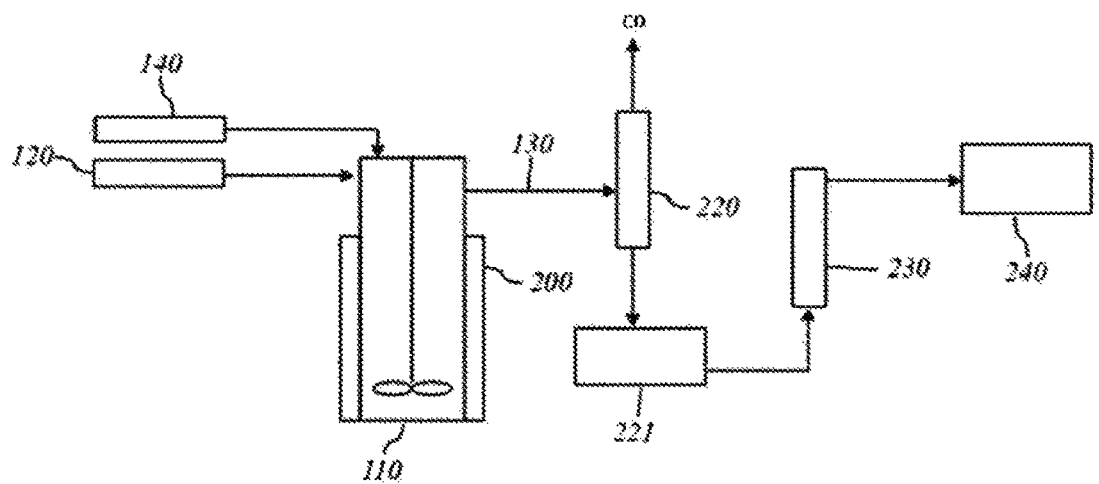

[FIG. 3]
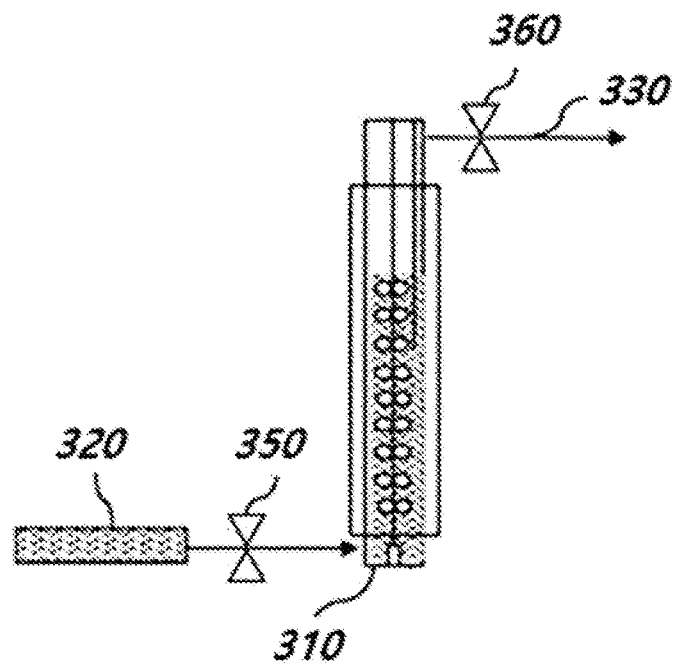
[FIG. 4]
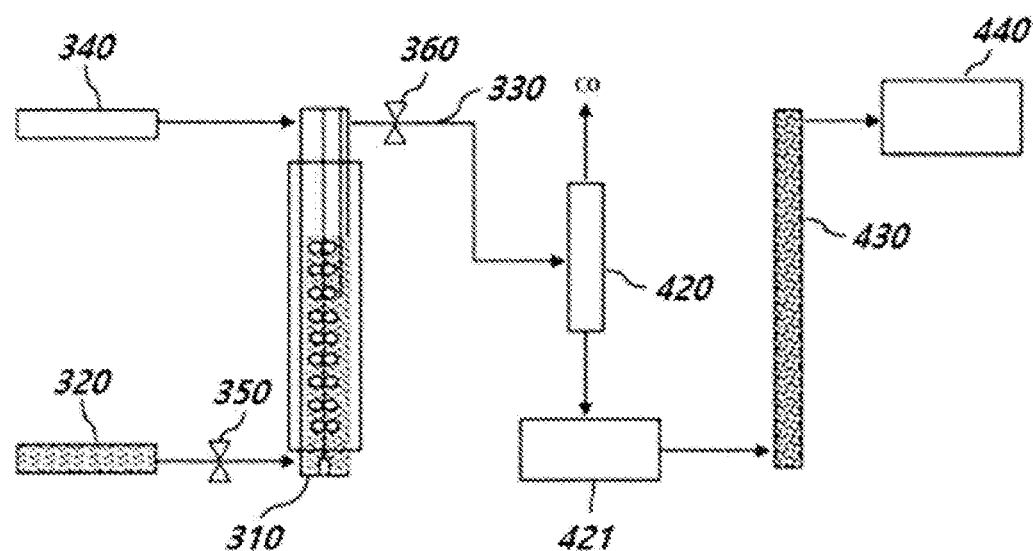

[FIG. 5]
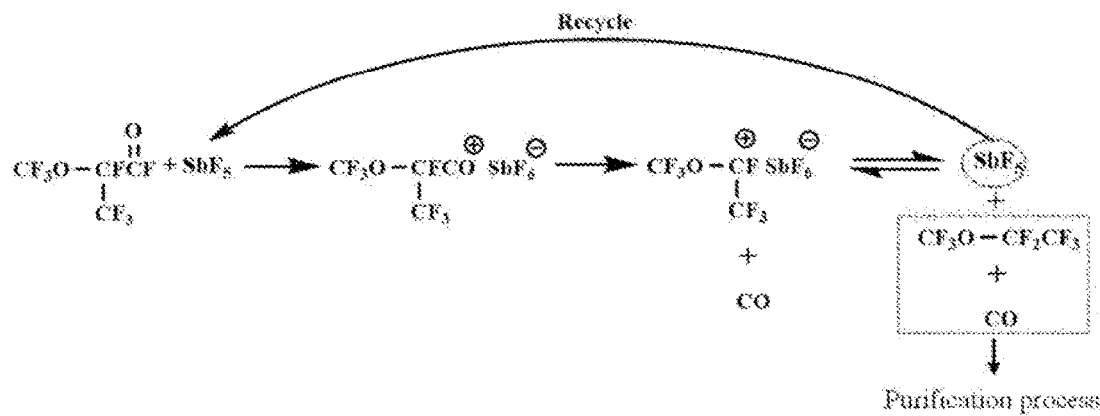
[FIG. 6]
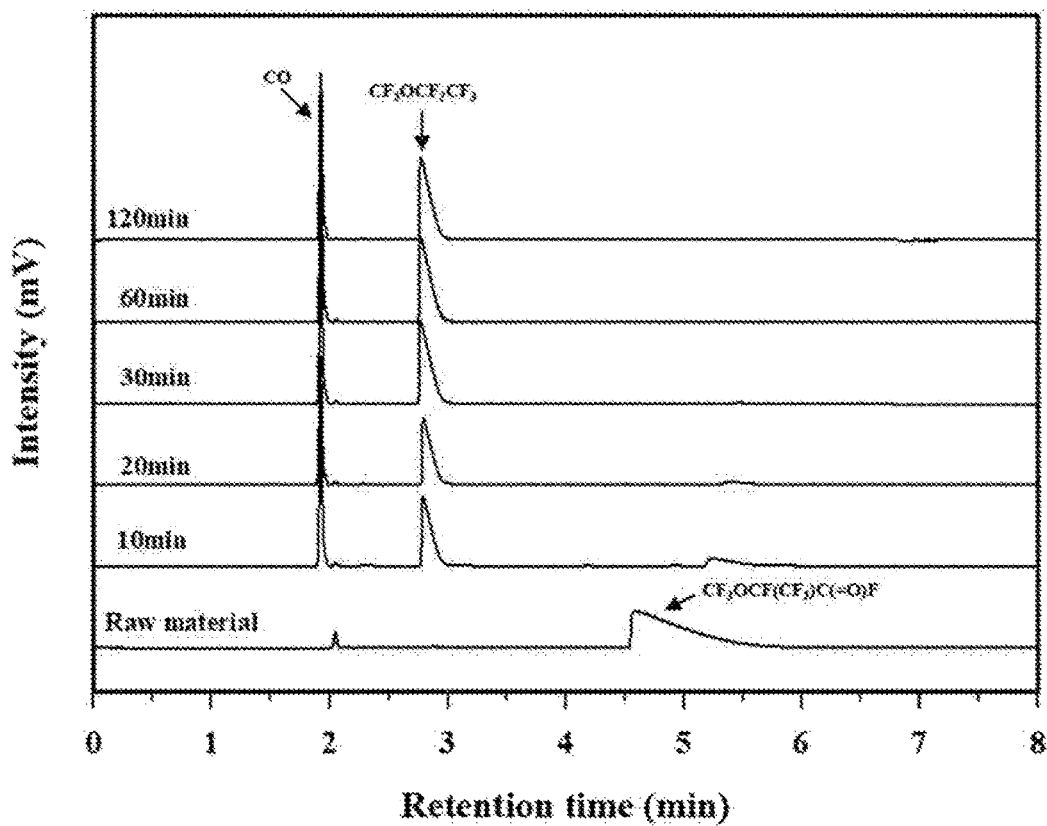

[FIG. 7]
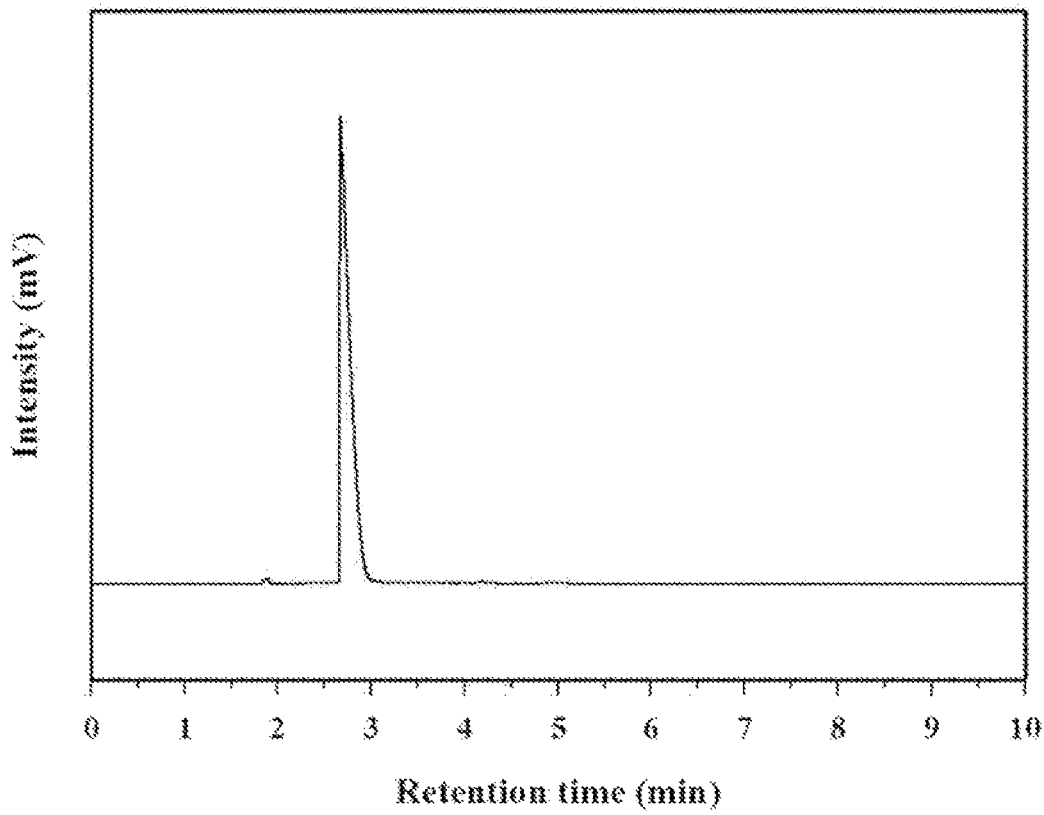
[FIG. 8]
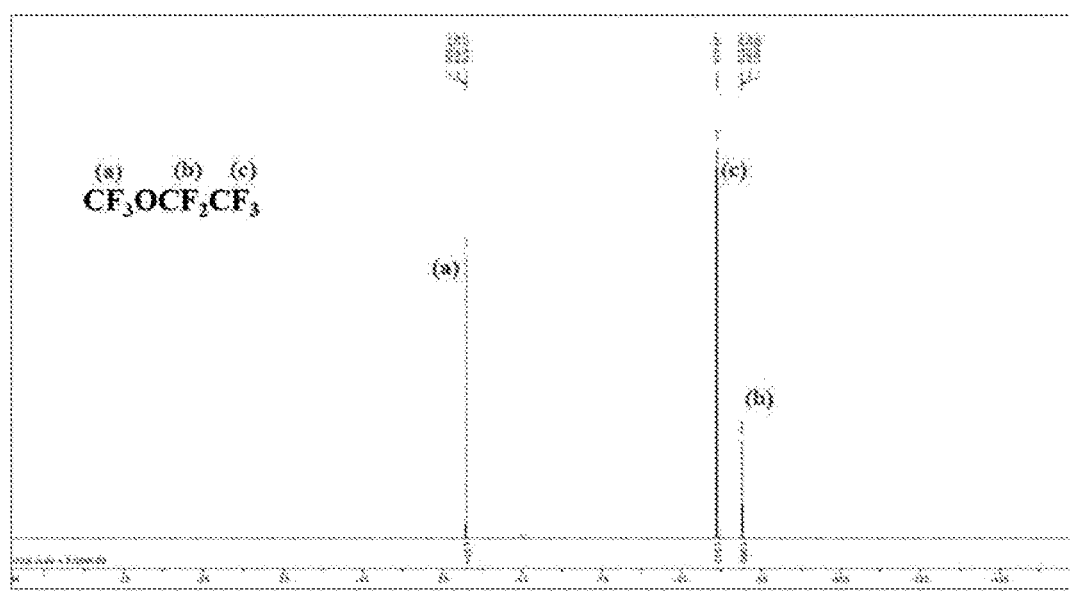

[FIG. 9]
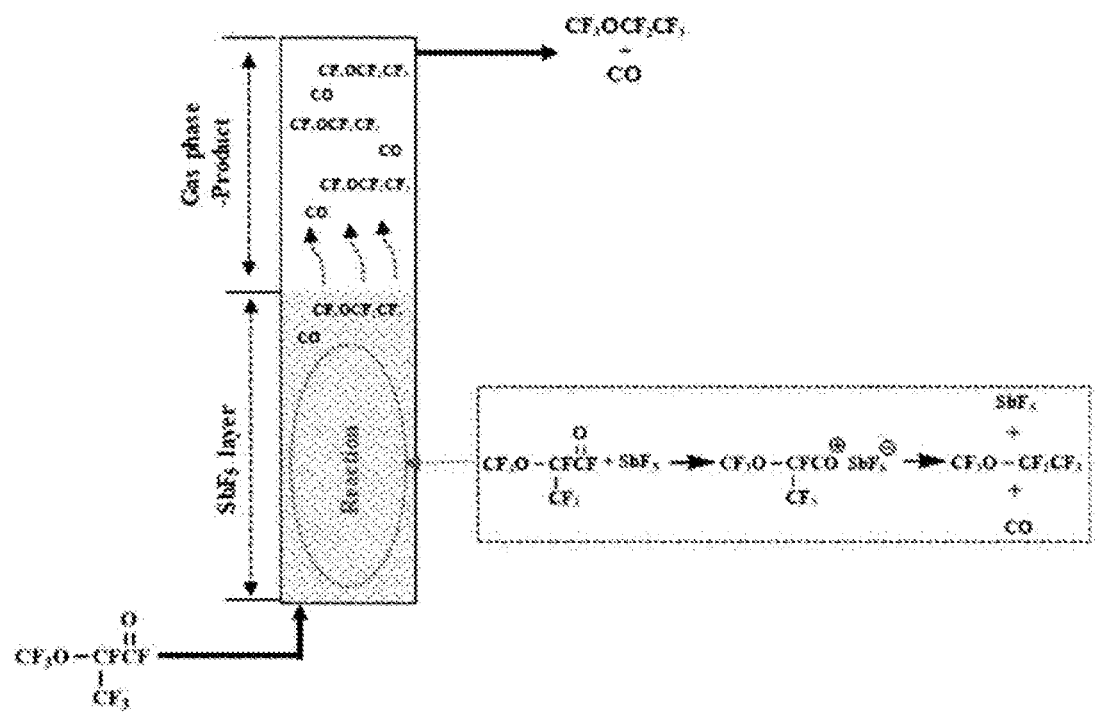
[FIG. 10]
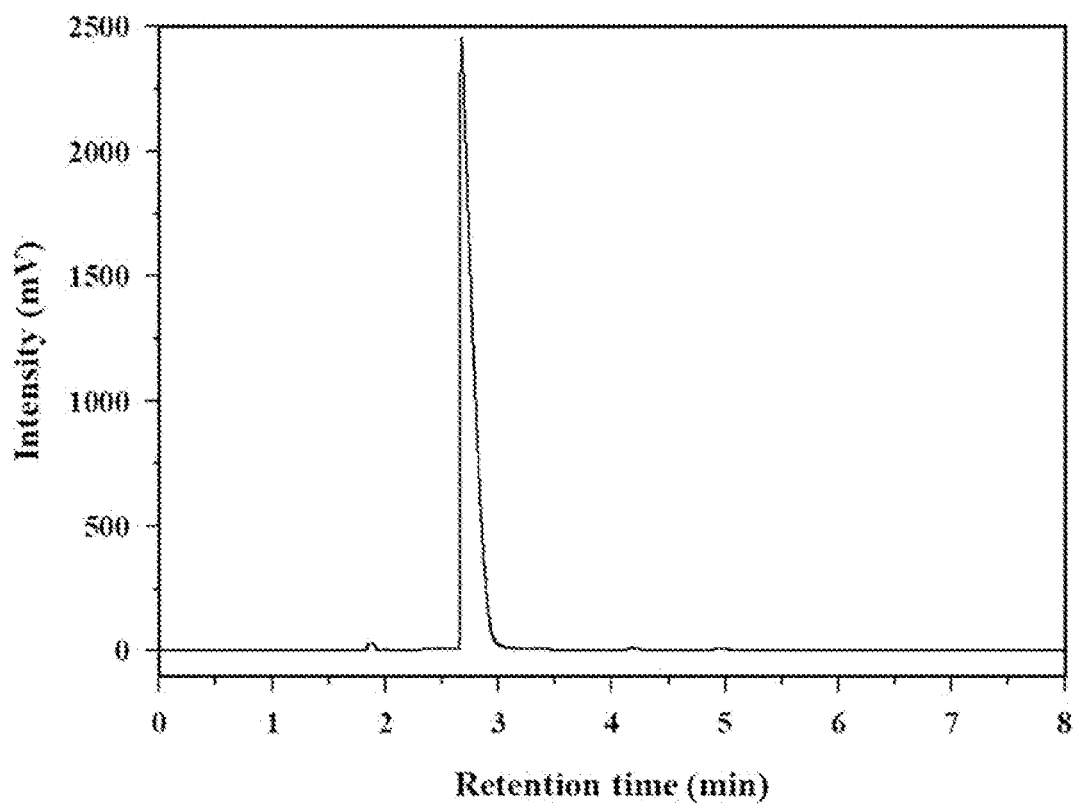

[FIG. 11]
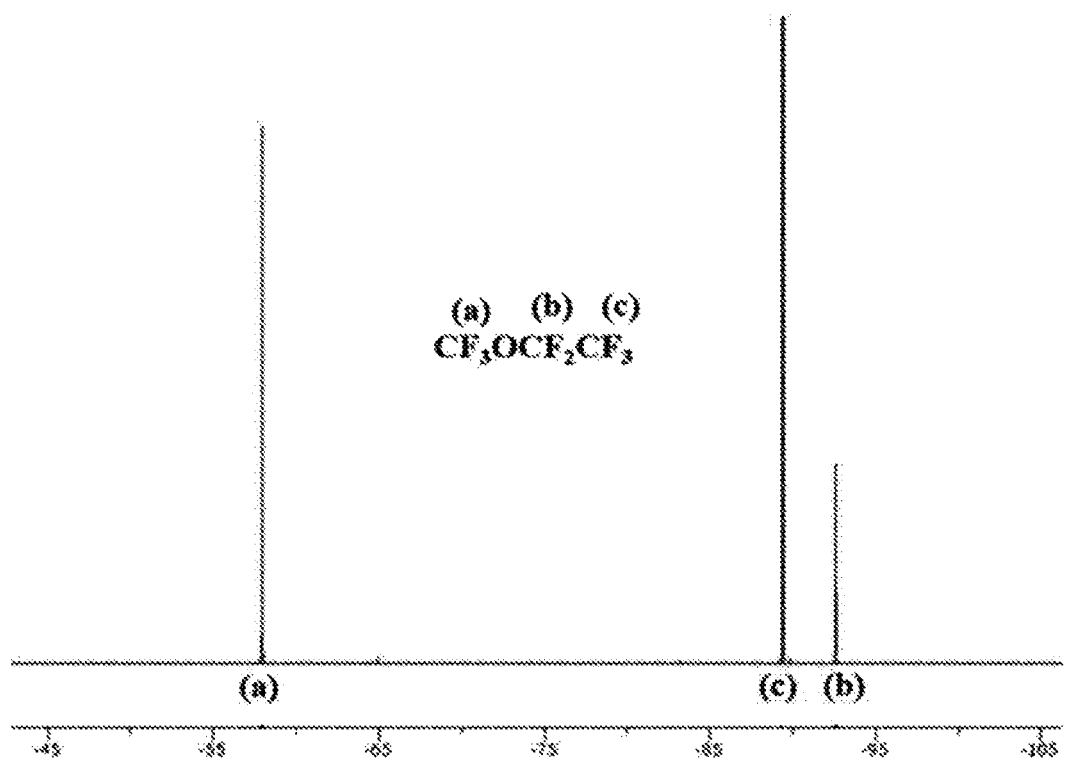

METHOD FOR PREPARING PERFLUORODIALKYL ETHER AND APPARATUS FOR PREPARING PERFLUORODIALKYL ETHER

CROSS REFERENCE TO RELATED APPLICATIONS

This application is a National Stage of International Application No. PCT/KR2021/009664, filed Jul. 26, 2021, claiming priorities to Korean Patent Application No. 10-2020-0094086 and Korean Patent Application No. 10-2020-0094087, filed Jul. 28, 2020 respectively, the entire disclosures of which are incorporated herein by reference.

TECHNICAL FIELD

The present invention relates to a method for preparing a perfluorodialkyl ether and an apparatus for preparing a perfluorodiallyl ether.

BACKGROUND ART $SF_6$ gas, called sulfur hexafluoride, is a colorless, odorless, flame retardant gas with low toxicity. In addition, it has high dielectric strength (about 3 times that of air), high thermal blocking efficiency (about 10 times that of air), and high heat transfer characteristic (about 2 times that of air) due to its property of combining with free electrons to form heavy ions with low mobility, making the development of electron avalanches very difficult. Therefore, it is widely used as insulating gas, etching gas, molten metal protection gas, etc. in the electrical and electronic industries, light metal industries, semiconductor industries, etc.

This $SF_6$ gas is non-toxic, has not been reported for potential acute or chronic ecotoxicity, and has very low solubility in water, posing no risk to surface water, groundwater or soil. In particular, since bioaccumulation does not occur, $SF_6$ gas is neither harmful to the ecosystem nor considered a carcinogen or mutagen.

However, $SF_6$ gas is harmless to the human body, but is known as a gas that promotes global warming along with $CO_2$, HFCs, and PFCs. As the global warming potential (GWP) of $SF_6$ gas is very high at 23,900 times that of $CO_2$, and the remaining time period of $SF_6$ gas in the atmosphere is as long as 3,200 years, it has become very environmentally important to recycle $SF_6$ gas without releasing it into the atmosphere.

In addition, recently, as it has been found that chemically stable $SF_6$ gas decomposes into various fluorides and/or sulfides under specific circumstances, interest in the effects of decomposition products of $SF_6$ gas on the environment and human body has also increased.

Various researches and developments are being conducted to replace the above $SF_6$ gas, and among various methods, research is being continuously conducted to introduce materials that can replace $SF_6$ gas.

DISCLOSURE

Technical Problem

In order to solve the above problems, the present invention is to provide perfluorodialkyl ether as an alternative gas to $SF_6$ gas. In particular, the present invention is to obtain perfluorodialkyl ether with high conversion and high-purity by repeatedly reusing metal fluoride or continuously supplying fluorine-containing acyl fluoride when preparing perfluorodialkyl ether from fluorine-containing acyl fluoride in the presence of a metal fluoride catalyst.

Technical Solution

According to an embodiment of the present invention, a method for preparing a perfluorodialkyl ether including the steps of (A) preparing a perfluorodialkyl ether from a compound represented by Formula 1 below in a presence of a metal fluoride; and (B) isolating the perfluorodialkyl ether.

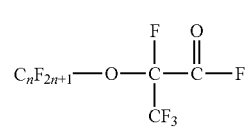

[Formula 1]

In Formula 1, n is an integer from 1 to 3.

In addition, according to another embodiment of the present invention, an apparatus for preparing a perfluorodialkyl ether, including a reactor that prepares a perfluorodialkyl ether from a compound represented by the Formula 1 in a presence of a metal fluoride; a reactant supplier that introduces the compound represented by the Formula 1 into the reactor; and a discharge unit that discharges the perfluorodialkyl ether from an upper portion of the reactor.

Advantageous Effects

The present invention can prepare a perfluorodialkyl ether with high conversion rate and high purity by repeatedly reusing the metal fluoride that is used during the manufacturing process of the perfluorodialkyl ether. Also, as the fluorine-containing acyl fluoride represented by Formula 1 is continuously supplied in the presence of metal fluoride, there is an effect of continuously preparing the perfluorodialkyl ether with high conversion rate and high purity in one single reactor.

In addition, the manufactured perfluorodialkyl ether has no problem of global warming as an alternative gas to $SF_6$ gas, and can be provided as an insulating gas, etching gas, or cleaning gas in various industrial fields, so it has very high utilization.

DESCRIPTION OF DRAWINGS

FIG. 1 is a diagram schematically illustrating a batch type apparatus for preparing a perfluorodialkyl ether according to an embodiment of the present invention.

FIG. 2 is a diagram schematically illustrating a batch type apparatus for preparing a perfluorodialkyl ether according to another embodiment of the present invention.

FIG. 3 is a diagram schematically illustrating a continuous type apparatus for preparing a perfluorodialkyl ether according to another embodiment of the present invention.

FIG. 4 is a diagram schematically illustrating a continuous type apparatus for preparing a perfluorodialkyl ether according to another embodiment of the present invention.

FIG. 5 is a diagram schematically illustrating a reaction mechanism according to Example 1 of the present invention.

FIG. 6 is a graph showing a result of gas chromatography over time for a perfluoromethylethyl ether prepared in Example 1 according to Experimental Example 1 of the present invention.

FIG. 7 is a graph showing a result of gas chromatography of a high-purity perfluoromethylethyl ether prepared in Example 1 according to Experimental Example 5 of the present invention.

FIG. 8 is a graph showing a result of $^{19}$F-nuclear magnetic resonance analysis of a perfluoromethylethyl ether prepared in Example 1 according to Experimental Example 5 of the present invention.

FIG. 9 is a diagram schematically illustrating a reaction mechanism and a process of discharging products in a continuous reactor according to Example 5 of the present invention.

FIG. 10 is a graph showing a result of gas chromatography of a perfluoromethylethyl ether prepared in Example 5 according to Experimental Example 9 of the present invention.

FIG. 11 is a graph showing a result of $^{19}$F-nuclear magnetic resonance analysis of a perfluoromethylethyl ether prepared in Example 5 according to Experimental Example 9 of the present invention.

MODE FOR INVENTION

Hereinafter, the present invention will be described in detail.

1. Method for Preparing a Perfluorodialkyl Ether

The present invention provides a method for preparing a perfluorodialkyl ether.

A method for preparing a perfluorodialkyl ether according to an embodiment of the present invention may include the steps of (A) preparing a perfluorodialkyl ether from a compound represented by Formula 1 below in the presence of a metal fluoride; and (B) isolating the perfluorodialkyl ether.

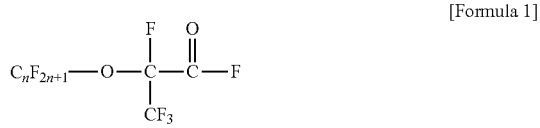

[Formula 1]

In Formula 1, n is an integer from 1 to 3.

Specifically, the compound represented by Formula 1 may include at least one selected from compounds represented by Formulas 1-1 to 1-4 below.

[Formula 1-1]

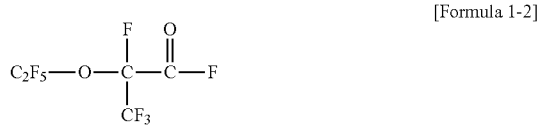

[Formula 1-2]

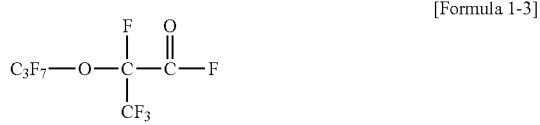

[Formula 1-3]

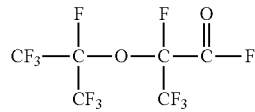

[Formula 1-4]

The compound represented by Formula 1 may include the compound represented by Formula 1-1.

The perfluorodialkyl ether may be prepared by a batch method in which step (B) is performed after step (A) is finished, and preferably, the perfluorodialkyl ether may be prepared by performing a plurality of cycles of steps (A) and (B) in one batch reactor reusing the metal fluoride.

In addition, in the case that the perfluorodialkyl ether is prepared by the batch method in which the cycle including the steps (A) and (B) is repeatedly performed a plurality of times, the method may further include the step of additionally introducing a compound represented by Formula (1) between the respective cycles.

The method for preparing a perfluorodialkyl ether according to another embodiment of the present invention may be a continuous method in which the steps (A) and (B) are performed continuously. Specifically, the method may include the steps of (A) preparing a perfluorodialkyl ether from the compound represented by Formula 1 continuously supplied from an outside in the presence of a metal fluoride; and (B) isolating the perfluorodialkyl ether and continuously discharging it to the outside.

The metal fluoride is not particularly limited as long as it corresponds to a Lewis acid that can be used for the preparation of the perfluorodialkyl ether. For example, the metal fluoride may include at least one selected from the group consisting of antimony pentafluoride ($SbF_5$), aluminum trifluoride ($AlF_3$), cobalt trifluoride ($CoF_3$) and a combination thereof.

In the case of the batch method, in the step (A), the compound represented by Formula 1 and the metal fluoride may be mixed in a molar ratio of 1:0.1 to 1:10. Specifically in the step (A), the compound represented by Formula 1 and the metal fluoride may be mixed in a molar ratio of 1:0.1 to 1:9, 1:0.2 to 1:8, 1:0.5 to 1:5, 1:0.8 to 1:2, or 1:0.9 to 1:2.

On the other hand, in the case of the continuous method, in step (A), the compound represented by Formula 1 may be continuously introduced from the outside at a flow rate of 0.5 parts by weight/min to 5 parts by weight/minute based on 100 parts by weight of the metal fluoride. Specifically, in the step (A), the compound represented by Formula 1 may be continuously introduced from the outside at a flow rate of 0.5 parts by weight/min to 4 parts by weight/min, 0.5 parts by weight/min to 3 parts by weight/min, 0.7 parts by weight/min to 2.5 parts by weight/min based on 100 parts by weight of the metal fluoride.

In the case of the batch method, when the mixing molar ratio of the compound represented by Formula 1 and the metal fluoride satisfies the above range, and in the case of the continuous method, when the flow rate of the compound represented by Formula 1 based on 100 weight of the metal fluoride satisfies the above range, the conversion rate of each product, the perfluorodialkyl ether, can be increased to a considerable level.

In addition, in the case of the batch method, the step (A) may be performed at −20 to 10° C., specifically −10 to 5° C. When the temperature of the step (A) satisfies the above range, a reaction time can be shortened, and at the same time, the conversion rate of the perfluorodialkyl ether can be increased. When the temperature in the step (A) is less than −20° C., the reaction proceeds relatively slowly, and when the temperature in the step (A) exceeds 10° C., the contact time with the metal fluoride in a liquid state is reduced due to the vaporization of the compound represented by Formula 1, which may increase the reaction time.

On the other hand, in the case of the continuous method, the step (A) may be performed at −15° C. to 10° C., specifically at −12° C. to 8° C., −10° C. to 5° C., or −8° C. to −5° C., or more specifically at −5° C. to 5° C. When the temperature in the step (A) satisfies the above range, the reaction time can be shortened and at the same time, the conversion rate of the perfluorodialkyl ether can be increased. When the temperature in the step (A) is less than −15° C., the conversion rate may decrease as the reaction temperature decreases, and when the temperature exceeds 10° C., the conversion rate may decrease rapidly, and the compound represented by Formula 1 may remain unreacted.

In addition, in the case of the continuous method, the internal pressure in the steps (A) and (B) may be controlled to 0.2 bar or more as a gauge pressure, and specifically to 0.4 bar or more. When the internal pressure is less than 0.2 bar as a gauge pressure, the concentration of the unreacted compound represented by Formula 1 increases as the internal pressure decreases, and thus the conversion rate may decrease.

In the step (B), the alkyl of the perfluorodialkyl ether may include an alkyl group having 1 to 3 carbon atoms. The two alkyl groups of the perfluorodialkyl ether may be the same as or different from each other.

In the step (B), the perfluorodialkyl ether may be represented by Formula 2 below.

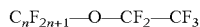　　　　　　　　　　　　　　　[Formula 2]

In Formula 2, n is an integer from 1 to 3.

Specifically, the perfluorodialkyl ether may include at least one selected from compounds represented by Formulas 2-1 to 2-4 below.

　　　　　　　　　　　　　　　[Formula 2-1]

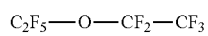　　　　　　　　　　　　　　　[Formula 2-2]

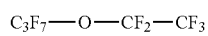　　　　　　　　　　　　　　　[Formula 2-3]

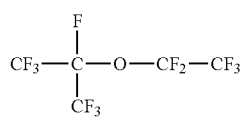　　　　　　　　　　　　　　　[Formula 2-4]

Preferably, the perfluorodialkyl ether may include a compound represented by Formula 2-1.

In the case of the batch method, the metal fluoride may be a filtrate remaining after isolating the perfluorodialkyl ether prepared in the step (B), and when the compound represented by Formula 1 is continuously supplied, the metal fluoride may be a filtrate remaining after isolating and discharging the perfluorodialkyl ether in the step (B).

The step (B) may be to isolate the perfluorodialkyl ether by gas-liquid isolation.

In the method for preparing the perfluorodialkyl ether, the compound represented by Formula 1 and the metal fluoride may exist in a liquid state under a reaction condition. On the other hand, since the perfluorodialkyl ether may exist in a gaseous form under a reaction condition, when a reaction occurs in a reactor to produce the perfluorodialkyl ether, the reactant in a liquid phase and the product in a gaseous phase are isolated from each other, so that the perfluorodialkyl ether may be isolated by the gas-liquid isolation.

In the step (A), a carbon monoxide may be generated as a by-product in addition to the perfluorodialkyl ether. Therefore, when the perfluorodialkyl ether is isolated by the gas-liquid isolation, the carbon monoxide gas may also be gas-liquid isolated from the reactant in a liquid phase together with the perfluorodialkyl ether, so that the carbon monoxide may be isolated.

In the process of preparing the perfluorodialkyl ether, since the filtrate containing residual metal fluoride remaining in the reactor may be reused without separate treatment and isolation, the perfluorodialkyl ether can be prepared with a high conversion rate simply by additionally introducing the compound represented by Formula 1 in the case of the batch method, or by continuously supplying the compound represented by Formula 1 from the outside in the case of the continuous method. Therefore, the perfluorodialkyl ether can be economically prepared without introducing an additional reaction device.

In addition, after the reaction is finished, the residual metal fluoride remaining in the reactor may be separately isolated and subjected to a process of removing components other than the metal fluoride, or the isolated metal fluoride may be stored separately and then reused.

The step (B) of isolating the perfluorodialkyl ether in the case of the batch method, or the step (B) of isolating the perfluorodialkyl and continuously discharging it to the outside in the case of the continuous method may further include the step of isolating the isolated perfluorodialkyl ether from the carbon monoxide.

The gaseous perfluorodialkyl ether and carbon monoxide are isolated from liquid reactants by the gas-liquid isolation and are discharged simultaneously, and the perfluorodialkyl ether may be isolated from the carbon monoxide through the step of cooling the discharged gas. In addition, the step of temporarily storing the perfluorodialkyl ether isolated from the carbon monoxide may be included.

The method for preparing the perfluorodialkyl ether may further include the step of distilling the perfluorodialkyl ether isolated in step (B).

The step of distilling may include the step of distilling the perfluorodialkyl ether isolated from the carbon monoxide.

The perfluorodialkyl ether obtained by distillation as described above has high purity, and may be used for its intended purpose after going through the step of storing the perfluorodialkyl ether in a separate storage.

2. Apparatus for Preparing a Perfluorodialkyl Ether

The present invention provides an apparatus for preparing a perfluorodialkyl ether. The apparatus for preparing a perfluoroalkyl ether of the present invention will be described in detail with reference to FIGS. 1 to 4.

An apparatus for preparing a perfluorodialkyl ether according to an embodiment of the present invention may be an apparatus for implementing a batch type preparation process or an apparatus for implementing a continuous type preparation process. Specifically, the apparatus may include a reactor 110, 310 that prepares a perfluorodialkyl ether from a compound represented by Formula 1 below in the presence of a metal fluoride; a reactant supplier 120, 320 that introduces the compound represented by Formula 1 into the reactor; and a discharge unit 130, 330 that discharges the perfluorodialkyl ether from an upper portion of the reactor.

More specifically, a continuous type apparatus for preparing a perfluorodialkyl ether according to another embodiment of the present invention may include the reactor 310 that prepares a perfluorodialkyl ether from a compound represented by Formula 1 in the presence of a metal fluoride; the reactant supplier 320 that supplies the compound represented by Formula 1 to the reactor 310; the discharge unit 330 that discharges the perfluorodialkyl ether from an upper portion of the reactor 310; a first pump 350 that continuously supplies the compound represented by Formula 1 to the reactor 310 through the reactant supplier 320; and a second pump 360 that continuously discharges the perfluorodialkyl ether to the outside of the reactor 310 through the discharge unit 330.

[Formula 1]

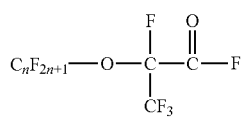

In Formula 1, n is an integer from 1 to 3.

The reactor 110, 310 may include a reactor in which the metal fluoride and the compound represented by Formula 1 react. In the case of the batch type apparatus, the reactor 110 may include a batch reactor, and may include, but is not limited to, a conventionally used batch reactor as long as it is a batch reactor. In the case of the continuous type apparatus, the reactor 310 may include a continuous reactor, and may include, but is not limited to, a conventionally used tubular reactor as long as it is a continuous reactor.

The reactor 110, 310 may further include a stirrer, and the stirrer may further include a stirring motor, a stirring bar, and a stirring part. The stirrer may use a commonly used stirring device.

The apparatus for preparing a perfluorodialkyl ether may further include a temperature controller 200, 400 that controls the temperature of the reactor 110, 310. In the case of the batch type apparatus, the temperature of the reactor 110 may be maintained at −20 to 10° C. through the temperature controller 200, and in the case of the continuous type apparatus, the temperature of the reactor 310 may be maintained at −15° C. to 10° C. through the temperature controller 400. When the temperature of the reactor 110 or 310 is maintained within the above range, a reaction time can be shortened, and at the same time, the conversion rate of the perfluorodialkyl ether can be increased.

The temperature controller 200, 400 may include a constant-temperature jacket. The constant-temperature jacket is a member for maintaining a constant temperature of the reactor 110, 310, and may further include a constant-temperature water supplier and/or a constant-temperature water discharge unit, but is not limited thereto.

The reactant supplier 120, 320 is a member for introducing the compound represented by Formula 1 into the reactor 110, 310.

The apparatus for preparing a perfluorodialkyl ether may further include a metal fluoride supplier 140, 340 that introduces the metal fluoride into the reactor 110, 310.

In the case of the batch type apparatus, the compound represented by Formula 1 and the metal fluoride may be mixed in a molar ration of 1:0.1 to 1:10 and supplied to the reactor 110 through the reactant supplier 120 and the metal fluoride supplier 140. Specifically, the compound represented by Formula 1 and the metal fluoride may be introduced by being mixed in a molar ration of 1:0.1 to 1:9, 1:0.2 to 1:8, 1:0.5 to 1:5, 1:0.8 to 1:2, or 1:0.9 to 1:2. When the mixing molar ratio of the compound represented by Formula 1 and the metal fluoride satisfies the above range, the conversion rate of the perfluorodialkyl ether, which is a product, can be significantly increased.

In addition, in the case of the continuous type apparatus, when the compound represented by Formula 1 is introduced into the reactor 310 through the reactant supplier 320, the first pump 350 may be further included to continuously supply the compound at a constant flow rate. The first pump 350 is organically connected to the reactant supplier 320 to supply the compound represented by Formula 1 from the reactant supplier 320 to the reactor 310 at a constant flow rate. Specifically, the first pump 350 may be controlled to continuously supply the compound represented by Formula 1 from the outside at a flow rate of 0.5 parts by weight/min to 5 parts by weight/min based on 100 parts by weight of the metal fluoride. Specifically, the first pump 350 may be controlled to continuously supply the compound represented by Formula 1 from the outside at a flow rate of 0.5 parts by weight/min to 4 parts by weight/min, 0.5 parts by weight/min to 3 parts by weight/min, or 0.7 parts by weight/min to 2.5 parts by weight/min, based on 100 parts by weight of the metal fluoride. When the flow rate of the compound represented by Formula 1 based on 100 weight of the metal fluoride satisfies the above range, the conversion rate of the product, the perfluorodialkyl ether, can be significantly increased.

The discharge unit 330 is to discharge the perfluorodialkyl ether prepared in the reactor 310 to the outside, and the discharge unit 330 may be connected to the upper portion of the reactor 310 to discharge the perfluorodialkyl ether from the upper portion of the reactor 310 to the outside.

In particular, in the case of the continuous type apparatus, the discharge unit 330 may be connected to the upper portion of the reactor 110, and may further include the second pump 360 to continuously discharge the perfluorodialkyl ether from the upper portion of the reactor 310 to the outside.

When the perfluorodialkyl ether is prepared in the reactor 310, a carbon monoxide is produced as a by-product in addition to the perfluorodialkyl ether, and gaseous perfluorodialkyl ether and carbon monoxide gas together with reactants are existed in the reactor 310. At this time, the carbon monoxide gas may also be discharged from the reactor 310 through the discharge unit 330. Particularly in the case of the continuous type apparatus, the carbon monoxide gas may be continuously discharged from the reactor 310 to the outside through the discharge unit 330 through the second pump 360. That is, in the case of using a continuous type apparatus, the perfluorodialkyl ether produced in the reactor 310 is continuously discharged to the outside, and the compound represented by Formula 1 is continuously supplied to the reactor 310, so that in the reactor 310, the perfluorodialkyl ether can be continuously prepared from the compound represented by Formula 1 in the presence of metal fluoride.

The perfluorodialkyl ether exists in a gaseous state under the reaction condition, so reactants and products may be isolated by gas-liquid isolation inside the reactor 110, 310. Specifically, the discharge unit 130, 330 may be connected to the reactor 110, 310 by being positioned above a liquid level where the liquid compound of Formula 1 and metal fluoride contained in the reactor 110, 310 exist.

In addition, the apparatus for preparing a perfluorodialkyl ether may further include a pressure controller that measures and/or controls the pressure of the reactor 110, 310. In particular, in the case of the continuous type apparatus, the internal pressure of the reactor 310 may be controlled to 0.2 bar or more, specifically, to 0.4 bar or more, as a gauge pressure through the pressure controller. In particular, when the internal pressure of the reactor 310 is less than 0.2 bar as a gauge pressure, the concentration of the unreacted compound represented by Formula 1 increases as the internal pressure decreases, and thus the conversion rate may decrease.

As described above, when the perfluorodialkyl ether is prepared, the compound represented by Formula 1 is additionally supplied through the reactant supplier 120 or 320 in the presence of the metal fluoride remaining in the reactor 110 or 310, and the produced perfluorodialkyl ether is discharged through the discharge unit 130, 330, so that supplying the reactants/discharging the products may be performed.

The filtrate containing the metal fluoride remaining in the reactor 110, 310 may be reused without separate treatment and isolation, so that the perfluorodialkyl ether can be prepared with a high conversion rate only by adding a small amount of the compound represented by Formula 1. Therefore, the perfluorodialkyl ether can be economically prepared without introducing an additional reaction device.

In addition, after the reaction is finished, the remaining metal fluoride remaining inside the reactor may be isolated from the reactor 110, 310 and subjected to a process of removing components other than metal fluoride, and the isolated metal fluoride may be stored separately and reused again.

The apparatus for preparing a perfluorodialkyl ether may further include a cooling unit 220, 420 that isolates the perfluorodialkyl ether isolated through the discharge unit 130, 330 from a carbon monoxide. The gaseous perfluorodialkyl ether and carbon monoxide are isolated from liquid reactants by gas-liquid isolation in the reactor 110, 310, and are simultaneously discharged through the discharge unit 130, 330 and supplied to the cooling unit 220, 420. In addition, through the step of cooling the gas discharged from the cooling unit 220, 420, the perfluorodialkyl ether is cooled and the carbon monoxide may be isolated into a gas. Any member for cooling gas may be used as the cooling unit 220, 420 without limitation.

The apparatus for preparing a perfluorodialkyl ether may include a first storage 221, 421 that temporarily stores the perfluorodialkyl ether isolated in the cooling unit 220, 420.

The apparatus for preparing a perfluorodialkyl ether may further include a distillation unit 230,430 that distills the perfluorodialkyl ether isolated in the cooling unit 220 or 420 or the perfluorodialkyl ether stored in the first storage 221 or 421 to obtain the perfluorodialkyl ether with high purity. Any member for distilling and isolating liquid into gas may be used as the distillation unit 230, 430 without limitation.

In addition, the apparatus for preparing a perfluorodialkyl ether may further include a second storage 240, 440 that stores the high-purity perfluorodialkyl ether obtained through the distillation unit 230, 430. As described above, the perfluorodialkyl ether stored in the second storage 240, 440 may be used according to its intended purpose.

Hereinafter, the present invention will be described in more detail through examples. However, these examples are only for helping the understanding of the present invention, and the scope of the present invention is not limited to these examples in any sense.

Example 1-1

1) about 46.7 g (0.2155 moles) of anhydrous antimony pentafluoride ($SbF_5$) was added in a 1 L batch reactor made of stainless steel with a constant-temperature jacket (see FIG. 2). The internal temperature of the reactor was maintained at about 0° C. using a temperature-raising circulator.

2) about 50 g (0.2155 moles) of 2,3,3,3-tetrafluoro-2-trifluoromethoxy propionyl fluoride ($CF_3OCF(CF_3)C(=O)F$) was added in the reactor of step 1), and stirred at a speed of about 200 rpm using a mechanical stirrer equipped with a turbine type stir bar.

3) When a product was synthesized through the reaction of step 2), the internal pressure of the reactor gradually increased. The temperature and stirring were maintained until the internal pressure of the reactor remained constant.

4) The perfluoromethylethyl ether ($CF_3OCF_2CF_3$) produced in step 3), from which a carbon monoxide was separated using a cooling unit maintained at −50° C., was stored in a first storage.

5) The perfluoromethylethyl ether in step 4) was provided to a distillation unit through a feed pump and subjected to a distillation process, and then the resulting high-purity perfluoromethylethyl ether was stored in a second storage.

Example 1-2

The perfluoromethylethyl ether was prepared in the same manner as in Example 1-1, except that an amount of anhydrous antimony pentafluoride introduced was changed to about 4.67 g (0.0215 moles).

Example 1-3

The perfluoromethylethyl ether was prepared in the same manner as in Example 1-1, except that an amount of anhydrous antimony pentafluoride introduced was changed to about 9.34 g (0.0431 moles).

Example 1-4

The perfluoromethylethyl ether was prepared in the same manner as in Example 1-1, except that an amount of anhydrous antimony pentafluoride introduced was changed to about 23.4 g (0.1078 moles).

Example 1-5

The perfluoromethylethyl ether was prepared in the same manner as in Example 1-1, except that an amount of anhydrous antimony pentafluoride introduced was changed to about 35.1 g (0.1617 moles).

Example 1-6

The perfluoromethylethyl ether was prepared in the same manner as in Example 1-1, except that an amount of anhydrous antimony pentafluoride introduced was changed to about 42.1 g (0.1940 moles).

Example 1-7

The perfluoromethylethyl ether was prepared in the same manner as in Example 1-1, except that an amount of anhydrous antimony pentafluoride introduced was changed to about 70.1 g (0.3233 moles).

Example 1-8

The perfluoromethylethyl ether was prepared in the same manner as in Example 1-1, except that an amount of anhydrous antimony pentafluoride introduced was changed to about 93.4 g (0.4310 moles).

Example 1-9

The perfluoromethylethyl ether was prepared in the same manner as in Example 1-1, except that the internal temperature of the reactor was changed to −20° C. instead of 0° C. in step 1).

Example 1-10

The perfluoromethylethyl ether was prepared in the same manner as in Example 1-1, except that the internal temperature of the reactor was changed to −10° C. instead of 0° C. in step 1).

Example 1-11

The perfluoromethylethyl ether was prepared in the same manner as in Example 1-1, except that the internal temperature of the reactor was changed to −5° C. instead of 0° C. in step 1).

Example 1-12

The perfluoromethylethyl ether was prepared in the same manner as in Example 1-1, except that the internal temperature of the reactor was changed to 5° C. instead of 0° C. in step 1).

Example 1-13

The perfluoromethylethyl ether was prepared in the same manner as in Example 1-1, except that the internal temperature of the reactor was changed to 10° C. instead of 0° C. in step 1).

Example 1-14

The perfluoromethylethyl ether was prepared in the same manner as in Example 1-1, except that the internal temperature of the reactor was changed to 20° C. instead of 0° C. in step 1).

Example 1-15

The perfluoromethylethyl ether was prepared in the same manner as in Example 1-1, except that the number of additions of step 2) to step 4) was added once by using the antimony pentafluoride remaining in the reactor after discharging the product in step 4).

Example 1-16

The perfluoromethylethyl ether was prepared in the same manner as in Example 1-1, except that the number of additions of step 2) to step 4) was added twice by using the antimony pentafluoride remaining in the reactor after discharging the product in step 4).

Example 1-17

The perfluoromethylethyl ether was prepared in the same manner as in Example 1-1, except that the number of additions of step 2) to step 4) was added three times by using the antimony pentafluoride remaining in the reactor after discharging the product in step 4).

Example 1-18

The perfluoromethylethyl ether was prepared in the same manner as in Example 1-1, except that the number of additions of step 2) to step 4) was added four times by using the antimony pentafluoride remaining in the reactor after discharging the product in step 4).

Example 1-19

The perfluoromethylethyl ether was prepared in the same manner as in Example 1-1, except that the number of additions of step 2) to step 4) was added five times by using the antimony pentafluoride remaining in the reactor after discharging the product in step 4).

Example 1-20

The perfluoromethylethyl ether was prepared in the same manner as in Example 1-1, except that the number of additions of step 2) to step 4) was added six times by using the antimony pentafluoride remaining in the reactor after discharging the product in step 4).

Example 1-21

The perfluoromethylethyl ether was prepared in the same manner as in Example 1-1, except that the number of additions of step 2) to step 4) was added seven times by using the antimony pentafluoride remaining in the reactor after discharging the product in step 4).

Example 1-22

The perfluoromethylethyl ether was prepared in the same manner as in Example 1-1, except that the number of additions of step 2) to step 4) was added eight times by using the antimony pentafluoride remaining in the reactor after discharging the product in step 4).

Example 1-23

The perfluoromethylethyl ether was prepared in the same manner as in Example 1-1, except that the number of additions of step 2) to step 4) was added nine times by using the antimony pentafluoride remaining in the reactor after discharging the product in step 4).

Example 1-24

The perfluoromethylethyl ether was prepared in the same manner as in Example 1-1, except that the number of additions of step 2) to step 4) was added ten times by using the antimony pentafluoride remaining in the reactor after discharging the product in step 4).

Example 1-25

The perfluoromethylethyl ether was prepared in the same manner as in Example 1-1, except that the number of additions of step 2) to step 4) was added eleven times by using the antimony pentafluoride remaining in the reactor after discharging the product in step 4).

Example 1-26

The perfluoromethylethyl ether was prepared in the same manner as in Example 1-1, except that the number of additions of step 2) to step 4) was added twelve times by using the antimony pentafluoride remaining in the reactor after discharging the product in step 4).

Example 2-1

1) about 1,200 g (5.537 moles) of anhydrous antimony pentafluoride ($SbF_5$) was added in a 0.7 L tubular continuous reactor with a constant-temperature jacket (see FIG. 3). The internal temperature of the reactor was maintained at about 0° C. using a temperature-raising circulator, and then, a stirring bar with multiple turbines was stirred at a speed of about 200 rpm using a mechanical stirrer.

2) 2,3,3,3-tetrafluoro-2-trifluoromethoxy propionyl fluoride ($CF_3OCF(CF_3)C(=O)F$) was introduced at a flow rate of about 25.0 g/min (0.108 moles/min) using a metering pump. A perfluoromethylethyl ether and a carbon monoxide produced through the reaction were continuously discharged through an outlet while maintaining the reactor internal pressure (gauge pressure) of 0.4 bar.

3) The carbon monoxide was separated from the perfluoromethylethyl ether ($CF_3OCF_2CF_3$) and carbon monoxide (CO) discharged in step 2) using a cooling unit maintained at −50° C., and the resulting perfluoromethylethyl ether was stored in a first storage.

4) The perfluoromethylethyl ether in the first storage in step 3) was provided to a distillation column through a feed pump and subjected to a high-purity distillation process, and then the resulting high-purity perfluoromethylethyl ether was stored in a second storage.

Example 2-2

The perfluoromethylethyl ether was prepared in the same manner as in Example 2-1, except that the flow rate of 2,3,3,3-tetrafluoro-2-trifluoromethoxy propionyl fluoride introduced was changed to about 8.7 g/min.

Example 2-3

The perfluoromethylethyl ether was prepared in the same manner as in Example 2-1, except that the flow rate of 2,3,3,3-tetrafluoro-2-trifluoromethoxy propionyl fluoride introduced was changed to about 10.4 g/min.

Example 2-4

The perfluoromethylethyl ether was prepared in the same manner as in Example 2-1, except that the input flow rate of 2,3,3,3-tetrafluoro-2-trifluoromethoxy propionyl fluoride was changed to about 12.5 g/min.

Example 2-5

The perfluoromethylethyl ether was prepared in the same manner as in Example 2-1, except that the input flow rate of 2,3,3,3-tetrafluoro-2-trifluoromethoxy propionyl fluoride was changed to about 30.0 g/min.

Example 2-6

The perfluoromethylethyl ether was prepared in the same manner as in Example 2-1, except that the input flow rate of 2,3,3,3-tetrafluoro-2-trifluoromethoxy propionyl fluoride was changed to about 37.5 g/min.

Example 2-7

The perfluoromethylethyl ether was prepared in the same manner as in Example 2-1, except that the input flow rate of 2,3,3,3-tetrafluoro-2-trifluoromethoxy propionyl fluoride was changed to about 50.0 g/min.

Example 2-8

The perfluoromethylethyl ether was prepared in the same manner as in Example 2-1, except that the input flow rate of 2,3,3,3-tetrafluoro-2-trifluoromethoxy propionyl fluoride was changed to about 62.5 g/min.

Example 2-9

The perfluoromethylethyl ether was prepared in the same manner as in Example 2-1, except that the input flow rate of 2,3,3,3-tetrafluoro-2-trifluoromethoxy propionyl fluoride was changed to about 75.0 g/min.

Example 2-10

The perfluoromethylethyl ether was prepared in the same manner as in Example 2-1, except that the input flow rate of 2,3,3,3-tetrafluoro-2-trifluoromethoxy propionyl fluoride was changed to about 87.5 g/min.

Example 2-11

The perfluoromethylethyl ether was prepared in the same manner as in Example 2-1, except that the input flow rate of 2,3,3,3-tetrafluoro-2-trifluoromethoxy propionyl fluoride was changed to about 100.0 g/min.

Example 2-12

The perfluoromethylethyl ether was prepared in the same manner as in Example 2-1, except that the reaction temperature was changed to about −12° C.

Example 2-13

The perfluoromethylethyl ether was prepared in the same manner as in Example 2-1, except that the reaction temperature was changed to about −8° C.

Example 2-14

The perfluoromethylethyl ether was prepared in the same manner as in Example 2-1, except that the reaction temperature was changed to about −5° C.

Example 2-15

The perfluoromethylethyl ether was prepared in the same manner as in Example 2-1, except that the reaction temperature was changed to about 5° C.

Example 2-16

The perfluoromethylethyl ether was prepared in the same manner as in Example 2-1, except that the reaction temperature was changed to about 8° C.

Example 2-17

The perfluoromethylethyl ether was prepared in the same manner as in Example 2-1, except that the reaction temperature was changed to about 10° C.

Example 2-18

The perfluoromethylethyl ether was prepared in the same manner as in Example 2-1, except that the reaction temperature was changed to about 15° C.

Example 2-19

The perfluoromethylethyl ether was prepared in the same manner as in Example 2-1, except that the internal pressure of the reactor was changed to about 0 bar.

Example 2-20

The perfluoromethylethyl ether was prepared in the same manner as in Example 2-1, except that the internal pressure of the reactor was changed to about 0.1 bar.

Example 2-21

The perfluoromethylethyl ether was prepared in the same manner as in Example 2-1, except that the internal pressure of the reactor was changed to about 0.2 bar.

Example 2-22

The perfluoromethylethyl ether was prepared in the same manner as in Example 2-1, except that the internal pressure of the reactor was changed to about 0.3 bar.

Example 2-23

The perfluoromethylethyl ether was prepared in the same manner as in Example 2-1, except that the internal pressure of the reactor was changed to about 0.5 bar.

Example 2-24

The perfluoromethylethyl ether was prepared in the same manner as in Example 2-1, except that the internal pressure of the reactor was changed to about 0.6 bar.

Example 2-25

The perfluoromethylethyl ether was prepared in the same manner as in Example 2-1, except that the internal pressure of the reactor was changed to about 0.8 bar.

<Experimental Example 1> Conversion Rate of Perfluoromethylethyl Ether According to Reaction Time in a Batch Process The conversion rate of the perfluoromethylethyl ether synthesized in Example 1-1 according to the reaction time was confirmed through gas chromatography (GC) analysis, and was shown in Table 1 below.

TABLE 1

| Reaction time (min) | Conversion rate (%) of perfluoromethylethyl ether |
| --- | --- |
| 10 | 64.3 |
| 20 | 78.5 |
| 30 | 94.3 |
| 60 | 95.3 |
| 80 | 96.3 |
| 100 | 96.4 |
| 120 | 96.4 |
| 150 | 96.4 |

According to Table 1, it was confirmed that the conversion rate increased as the reaction time increased, but after about 100 minutes, the conversion rate appeared constant at about 96.4%.

<Experimental Example 2> Reaction Time and Conversion Rate of Perfluoromethylethyl Ether According to an Input Amount of Antimony Pentafluoride in a Batch Process The reaction time and conversion rate of the perfluoromethylethyl ether prepared in Examples 1-1 to 1-8 according to an input amount of antimony pentafluoride were confirmed through the same analysis method as in Experimental Example 1, and were shown in Table 2 below.

TABLE 2

| Category | 2,3,3,3-tetrafluoro-2-trifluoromethoxy propionyl fluoride(A) | antimony pentafluoride(B) | B/A molar ratio | Reaction time(h) | Conversion rate(%) |
| --- | --- | --- | --- | --- | --- |
| Example 1-1 | 50 g (0.2155 moles) | 46.7 g (0.2155 moles) | 1.0000 | 1.67 | 96.4 |
| Example 1-2 | 50 g (0.2155 moles) | 4.67 g (0.0215 moles) | 0.0998 | 23.61 | 93.7 |
| Example 1-3 | 50 g (0.2155 moles) | 9.34 g (0.0431 moles) | 0.2000 | 14.74 | 94.1 |
| Example 1-4 | 50 g (0.2155 moles) | 23.4 g (0.1078 moles) | 0.5002 | 5.84 | 94.9 |
| Example 1-5 | 50 g (0.2155 moles) | 35.1 g (0.1617 moles) | 0.7503 | 2.45 | 95.7 |
| Example 1-6 | 50 g (0.2155 moles) | 42.1 g (0.1940 moles) | 0.9002 | 1.89 | 96.1 |
| Example 1-7 | 50 g (0.2155 moles) | 70.1 g (0.3233 moles) | 1.5002 | 1.66 | 96.3 |
| Example 1-8 | 50 g (0.2155 moles) | 93.4 g (0.4310 moles) | 2.0000 | 1.67 | 96.4 |

As shown in Table 2, when the antimony pentafluoride was added at a molar ratio (B/A) of 0.1 to 10 relative to 2,3,3,3-tetrafluoro-2-trifluoromethoxy propionyl fluoride, a conversion rate of about 94% or more was exhibited. At the molar ratio of 0.9 or more, a high conversion rate of about 96.1% or more was exhibited. On the other hand, the required reaction time decreased as the input molar ratio of antimony pentafluoride increased, and at the molar ratio of about 1.0, the reaction time became the shortest time of about 1.67, and the final conversion rate was reached.

<Experimental Example 3> Reaction Time and Conversion Rate of Perfluoromethylethyl Ether According to Reaction Temperature in a Batch Process The reaction time and conversion rate of the perfluoromethylethyl ether prepared in Examples 1-1 and Examples 1-9 to 1-14 according to the reaction temperature were confirmed through the same analysis method as in Experimental Example 1, and were shown in Table 3.

and the contact time with antimony pentafluoride in a liquid state was reduced at a reaction temperature above 10° C. due to the vaporization of 2,3,3,3-tetrafluoro-2-trifluoromethoxypropionyl fluoride (having a boiling point of about 9 to 12° C.). Accordingly, it was confirmed that a relatively long reaction time was required.

<Experimental Example 4> Conversion Rate of Perfluoromethylethyl Ether Prepared by Reusing Antimony Pentafluoride in a Batch Process The reaction time and conversion rate of the perfluoromethylethyl ether prepared in Example 1-1 and Examples 1-15 to 1-26 were confirmed through the same analysis method as in Experimental Example 1, and were shown in Table 4 below.

TABLE 4

| Category | 2,3,3,3-tetrafluoro-2-trifluoromethoxy propionyl fluoride | antimony pentafluoride | Reaction time(h) | Conversion rate(%) |
|---|---|---|---|---|
| Example 1-1 | 50 g (0.2155 moles) | 46.7 g (0.2155 moles) | 1.67 | 96.4 |
| Example 1-15 | 50 g (0.2155 moles) | Reuse | 1.65 | 95.6 |
| Example 1-16 | 50 g (0.2155 moles) | Reuse | 1.68 | 95.7 |
| Example 1-17 | 50 g (0.2155 moles) | Reuse | 1.69 | 95.6 |
| Example 1-18 | 50 g (0.2155 moles) | Reuse | 1.68 | 95.6 |
| Example 1-19 | 50 g (0.2155 moles) | Reuse | 1.72 | 95.5 |
| Example 1-20 | 50 g (0.2155 moles) | Reuse | 1.84 | 95.4 |
| Example 1-21 | 50 g (0.2155 moles) | Reuse | 1.91 | 95.3 |
| Example 1-22 | 50 g (0.2155 moles) | Reuse | 2.14 | 94.4 |
| Example 1-23 | 50 g (0.2155 moles) | Reuse | 2.26 | 93.1 |
| Example 1-24 | 50 g (0.2155 moles) | Reuse | 2.43 | 91.1 |
| Example 1-25 | 50 g (0.2155 moles) | Reuse | 2.63 | 88.9 |
| Example 1-26 | 50 g (0.2155 moles) | Reuse | 2.99 | 85.2 |

TABLE 3

| Category | Reaction Temperature(° C.) | Reaction time(h) | Conversion rate(%) |
|---|---|---|---|
| Example 1-1 | 0 | 1.67 | 96.4 |
| Example 1-9 | −20 | 3.20 | 94.2 |
| Example 1-10 | −10 | 1.75 | 96.3 |
| Example 1-11 | −5 | 1.68 | 96.4 |
| Example 1-12 | 5 | 1.83 | 96.1 |
| Example 1-13 | 10 | 2.84 | 95.0 |
| Example 1-14 | 20 | 4.11 | 92.7 |

As shown in Table 3, at a reaction temperature of −20° C. to 10° C., a conversion rate of 94% or more and a reaction time of 3.2 hours or less were exhibited. On the other hand, the reaction between antimony pentafluoride and 2,3,3,3-tetrafluoro-2-trifluoromethoxy propionyl fluoride proceeded relatively slowly at a reaction temperature below −20° C., As shown in Table 4, in the case that antimony pentafluoride was reused, until Examples 1-21, in which antimony pentafluoride was reused 7 times, a reaction time was 1.91 hours or less, and a conversion rate was 95% or more. In contrast, in Example 1-22 in which antimony pentafluoride was reused 8 times, a reaction time was 2.14 hours and a conversion rate was 94.4%. Moreover, in Examples 1-26 in which antimony pentafluoride was reused 12 times, a reaction time was 2.99 hours and a conversion rate was 85.2%.

<Experimental Example 5> Purity and Yield of Perfluoromethylethyl Ether in a Batch Process Table 5 showed the confirmed purity and yield of the perfluoromethylethyl ether synthesized in Example 1 and Examples 1-13 to 1-16 through distillation.

TABLE 5

| Category | Purity(%) | Yield(%) |
|---|---|---|
| Example 1 | 99.1 | 85.0 |
| Example 1-13 | 99.3 | 85.4 |
| Example 1-14 | 98.9 | 84.9 |
| Example 1-15 | 99.0 | 85.1 |
| Example 1-16 | 99.1 | 84.9 |

<Experimental Example 6> Conversion Rate of Perfluoromethylethyl Ether According to a Flow Rate in a Continuous Process The conversion rate of the perfluoromethylethyl ether synthesized in Examples 2-1 to 2-11 was confirmed through the same analysis method as in Experimental Example 1, and was shown in Table 6 below.

TABLE 6

| Category | Input flow rate (g/min) of 2,3,3,3-tetrafluoro-2-trifluoromethoxy propionyl fluoride | Input flow rate (g/min) of 2,3,3,3-tetrafluoro-2-trifluoromethoxy propionyl fluoride/ antimony pentafluoride(g) | Conversion rate(%) of perfluoromethylethyl ether |
|---|---|---|---|
| Example 2-1 | 25.0 | 0.0208 | 94.9 |
| Example 2-2 | 8.7 | 0.0073 | 95.0 |
| Example 2-3 | 10.4 | 0.0087 | 95.0 |
| Example 2-4 | 12.5 | 0.0104 | 94.9 |
| Example 2-5 | 30.0 | 0.0250 | 94.1 |
| Example 2-6 | 37.5 | 0.0313 | 93.6 |
| Example 2-7 | 50.0 | 0.0417 | 92.1 |
| Example 2-8 | 62.5 | 0.0521 | 84.4 |
| Example 2-9 | 75.0 | 0.0625 | 75.3 |
| Example 2-10 | 87.5 | 0.0729 | 63.7 |
| Example 2-11 | 100.0 | 0.0833 | 52.1 |

As shown in Table 6, as the input flow rate (g/min) of 2,3,3,3-tetrafluoro-2-trifluoromethoxypropionyl fluoride relative to the weight (g) of antimony pentafluoride introduced into the reactor decreased, the conversion rate of perfluoromethylethyl ether showed a tendency to increase. In particular, it was confirmed that a high conversion rate of 94.9% or more and a constant value were exhibited when the input flow rate (g/min) of 2,3,3,3-tetrafluoro-2-trifluoromethoxypropionyl fluoride relative to the weight (g) of antimony pentafluoride was about 0.0208 or less.

<Experimental Example 7> Conversion Rate of Perfluoromethylethyl Ether According to Reaction Temperature in a Continuous Process The conversion rate of the perfluoromethylethyl ether prepared in Examples 2-1 and Examples 2-12 to 2-18 was confirmed through the same analysis method as in Experimental Example 1, and was shown in Table 7 below.

TABLE 7

| Category | Reaction temperature(° C.) | Conversion rate(%) of perfluoromethylethyl ether |
|---|---|---|
| Example 2-1 | 0 | 94.9 |
| Example 2-12 | −12 | 91.9 |
| Example 2-13 | −8 | 94.1 |
| Example 2-14 | −5 | 94.9 |
| Example 2-15 | 5 | 94.4 |

TABLE 7-continued

| Category | Reaction temperature(° C.) | Conversion rate(%) of perfluoromethylethyl ether |
|---|---|---|
| Example 2-16 | 8 | 90.2 |
| Example 2-17 | 10 | 83.4 |
| Example 2-18 | 15 | 72.1 |

As shown in Table 7, when the internal temperature of the reactor was −15° C. to 10° C., a conversion rate of about 83% or more was exhibited. When the internal temperature of the reactor was −12° C. to 8° C., a conversion rate of about 90% or more was exhibited. In addition, when the internal temperature of the reactor was −8° C. to 5° C., a conversion rate of about 94% or more was exhibited. In particular, it was confirmed that at a reaction temperature of 15° C., 27.9% of 2,3,3,3-tetrafluoro-2-trifluoromethoxy propionyl fluoride were unreacted.

<Experimental Example 8> Conversion Rate of Perfluoromethylethyl Ether According to an Internal Pressure of a Reactor in a Continuous Process The conversion rate of the perfluoromethylethyl ether prepared in Example 2-1 and Examples 2-19 to 2-25 was confirmed through the same analysis method as in Experimental Example 1, and was shown in Table 8 below.

TABLE 8

| Category | Internal pressure of a reactor (gauge pressure) (bar) | Conversion rate(%) of perfluoromethylethyl ether |
|---|---|---|
| Example 2-1 | 0.4 | 94.9 |
| Example 2-19 | 0.0 | 87.8 |
| Example 2-20 | 0.1 | 89.9 |
| Example 2-21 | 0.2 | 91.7 |
| Example 2-22 | 0.3 | 93.2 |
| Example 2-23 | 0.5 | 94.9 |
| Example 2-24 | 0.6 | 94.8 |
| Example 2-25 | 0.8 | 94.9 |

As shown in Table 8, a high conversion rate of 91% or more was exhibited when the internal pressure of the reactor was 0.2 bar or more.

When the internal pressure of the reactor was 0.4 bar or more, a high conversion rate of 94% or more was exhibited. On the other hand, when the internal pressure of the reactor was less than 0.2 bar, the concentration of unreacted 2,3,3,3-tetrafluoro-2-trifluoromethoxy propionyl fluoride increased as the internal pressure decreased, and a relatively low conversion rate of about 87.8% was exhibited when the internal pressure of the reactor was 0 bar.

<Experimental Example 9> Purity of Perfluoromethylethyl Ether in a Continuous Process Table 9 showed the confirmed purity of the perfluoromethylethyl ether synthesized in Examples 2-1 to 2-3 through distillation.

TABLE 9

| Category | Purity (%) of perfluoromethylethyl ether after distillation |
|---|---|
| Example 2-1 | 99.1 |
| Example 2-2 | 99.0 |
| Example 2-3 | 99.1 |

DESCRIPTION OF REFERENCE NUMERALS

110: reactor
120: reactant supplier
130: discharge unit
140: metal fluoride supplier
200: temperature controller
220: cooling unit
221: first storage
230: distillation unit
240: second storage
310: reactor
320: reactant supplier
330: discharge unit
340: metal fluoride supplier
350: first pump
360: second pump
400: temperature controller
420: cooling unit
421: first storage
430: distillation unit
440: second storage

The invention claimed is:

1. A method for preparing a perfluorodialkyl ether comprising the steps of:
   (A) preparing a perfluorodialkyl ether from a compound represented by Formula 1 below in a presence of a metal fluoride as a Lewis acid; and
   (B) isolating the perfluorodialkyl ether:

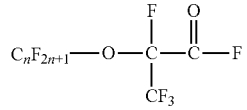

[Formula 1]

in Formula 1, n is an integer from 1 to 3.

2. The method of claim 1, wherein the step (B) is performed after the step (A) is finished.

3. The method of claim 2, wherein a cycle including the steps (A) and (B) is repeatedly performed a plurality of times,
the method further comprises, between the respective cycles, the step of additionally introducing a compound represented by Formula 1 below:

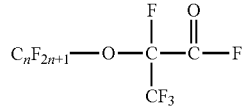

[Formula 1]

in Formula 1, n is an integer from 1 to 3.

4. The method of claim 1, wherein in the step (A), the compound represented by Formula 1 is continuously supplied from an outside,
the perfluorodialkyl ether isolated in the step (B) is continuously discharged to the outside.

5. The method of claim 1, wherein the step (B) is to isolate the perfluorodialkyl ether by gas-liquid isolation.

6. The method of claim 1, wherein the perfluorodialkyl ether is represented by Formula 2 below:

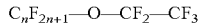

[Formula 2]

in Formula 2, n is an integer from 1 to 3.

7. The method of claim 1, wherein the metal fluoride includes at least one selected from the group consisting of antimony pentafluoride, aluminum trifluoride, cobalt trifluoride and a combination thereof.

8. The method of claim 2, wherein in the step (A), the compound represented by Formula 1 and the metal fluoride are mixed in a molar ratio of 1:0.1 to 1:10.

9. The method of claim 4, wherein in the step (A), the compound represented by Formula 1 is continuously supplied from the outside at a flow rate of 0.5 parts by weight/min to 5 parts by weight/min based on 100 parts by weight of the metal fluoride.

10. The method of claim 2, wherein the step (A) is performed at −20° C. to 10° C.

11. The method of claim 4, wherein the step (A) is performed at −15° C. to 10° C.

12. The method of claim 4, wherein in the steps (A) and (B), an internal pressure is controlled to 0.2 bar or more as a gauge pressure.

* * * * *